United States Patent [19]

Bennett et al.

[11] 4,386,755

[45] Jun. 7, 1983

[54] MOLD FOR REMOTE CONTROL ASSEMBLY (VIBRATION DAMPENING)

[75] Inventors: William G. Bennett, Troy; Arthur L. Spease, Livonia, both of Mich.

[73] Assignee: Teleflex Incorporated, Limerick, Pa.

[21] Appl. No.: 343,887

[22] Filed: Jan. 29, 1982

Related U.S. Application Data

[62] Division of Ser. No. 162,172, Jun. 23, 1980, Pat. No. 4,348,348.

[51] Int. Cl.³ ............................................. B29F 1/00
[52] U.S. Cl. .................................. 249/83; 425/129 R
[58] Field of Search ................ 249/83, 95; 425/110, 425/111, 123, 125, 126, 127, 128, 129 R

[56] References Cited

U.S. PATENT DOCUMENTS

| 2,684,502 | 7/1954 | Paulve | 425/127 X |
| 3,074,112 | 1/1963 | Bobrow | 249/83 X |
| 3,293,694 | 12/1966 | Taylor | 425/123 |
| 3,543,349 | 12/1970 | Marocco | 425/129 |
| 4,061,522 | 12/1977 | Bauerkemper | 425/127 X |
| 4,167,359 | 9/1979 | Liautaud | 425/129 R X |

Primary Examiner—J. Howard Flint, Jr.
Attorney, Agent, or Firm—Harold W. Milton, Jr.

[57] ABSTRACT

A mold assembly and a method are disclosed for making a motion transmitting remote control assembly including the steps of; inserting the end portion of the conduit into a cavity of a first mold and injecting organic polymeric material into the cavity for molding the end fitting about the conduit, inserting the end fitting into a cavity of a second mold and injecting a vibration dampening material into the mold for molding a vibration dampener about the end fitting, and placing the vibration dampener into a cavity of a third mold and injecting an organic polymeric material for molding a support housing about the vibration dampener.

1 Claim, 7 Drawing Figures

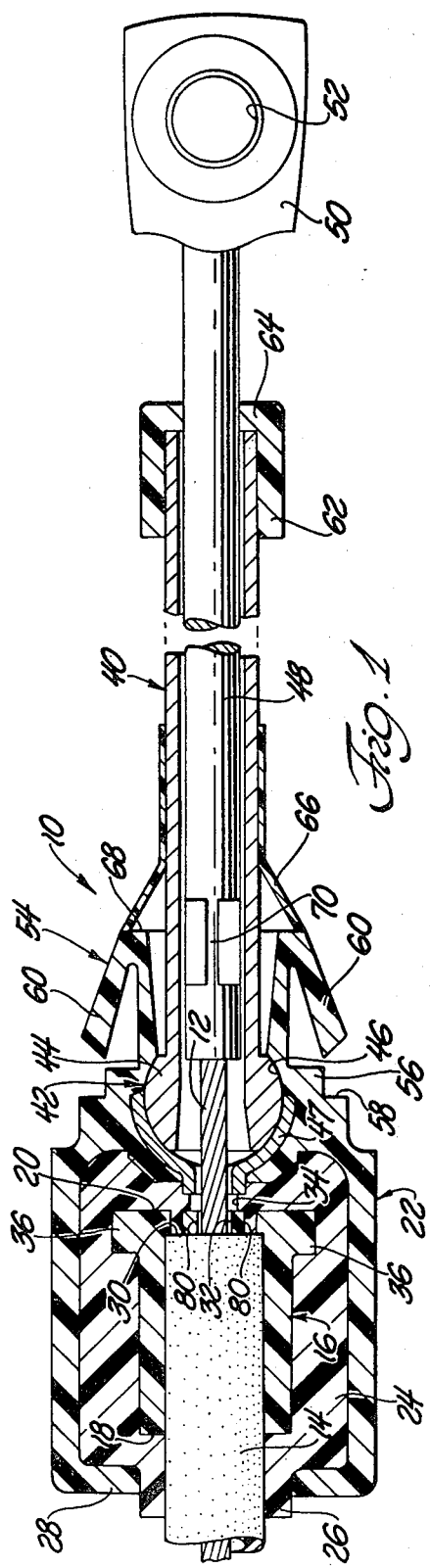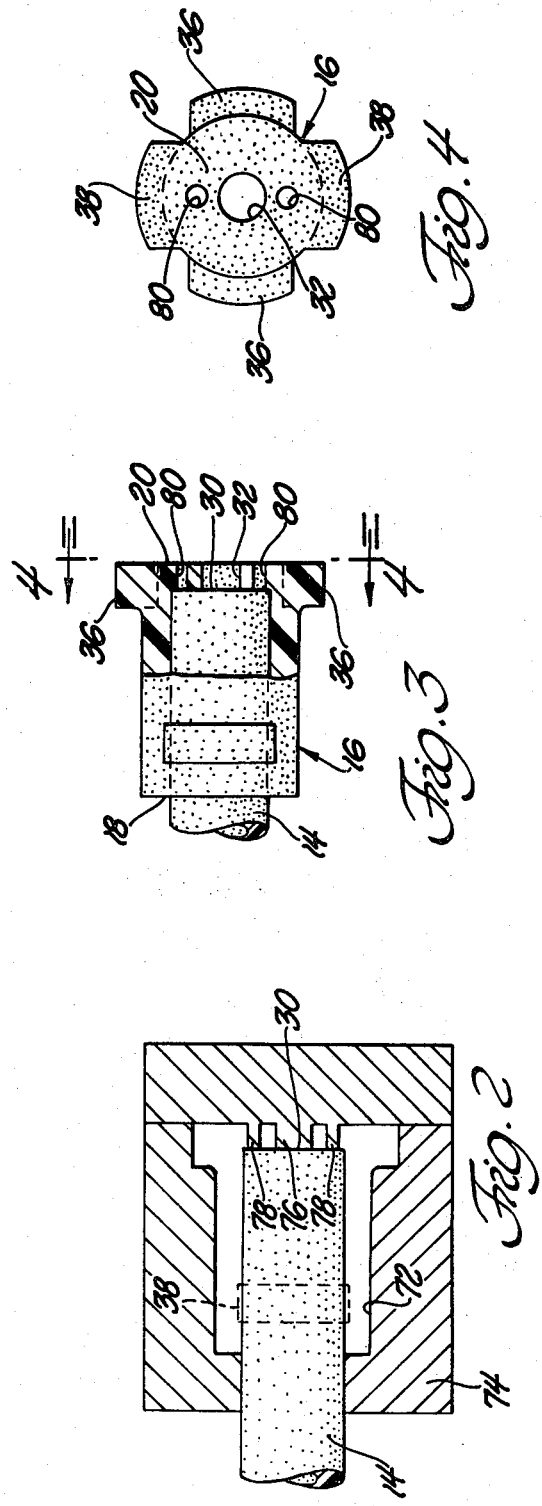

MOLD FOR REMOTE CONTROL ASSEMBLY (VIBRATION DAMPENING)

This application is a divisional of application Ser. No. 162,172, filed Jun. 23, 1980, now U.S. Pat. No. 4,348,348.

BACKGROUND OF THE INVENTION

The invention relates to mold for making a motion transmitting remote control assembly.

Description of the Prior Art

Prior art push-pull assemblies have included support housings disposed within a bulkhead or partition for supporting a push-pull cable passing therethrough. Generally, the assembly consists of a conduit having an end fitting such that the end fitting is disposed within the support housing. A problem arises when vibrations, originating in the support housing, are passed to the cable through the end fitting or vice versa.

PRIOR ART STATEMENT

An example of a cable assembly including a vibration dampener is the U.S. Pat. No. 2,918,808 to Botti issued Dec. 29, 1959. The Botti patent teaches a speedometer cable assembly including a circular tubular sleeve which is press-fitted on a cable so as to provide attenuation of the sound waves. Another patent teaching a similar structure is the U.S. Pat. No. 3,101,205 to Benham issued Aug. 20, 1963. The Benham patent teaches the use of a flexible end fitting for securing a cable assembly within an aperture of a bulkhead.

The two aforementioned patents do not teach an end fitting molded about a conduit which is molded within a vibration dampener, the vibration dampener being molded within a support housing for retaining the assembly within an aperture of a wall such that the vibration dampener isolates vibrations between the end fittings and support housing. In other words, neither the Botti nor the Benham patent solves the problem of dampening vibrations which are passed from the bulkhead through the end fitting to the push-pull cable such that movement of the cable is not attenuated while the vibrations are effectively dampened, or vice versa.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view substantially along the longitudinal axis of a motion transmitting remote control assembly constructed in accordance with the instant disclosure;

FIG. 2 is a cross-sectional view showing a conduit disposed within a mold assembly for making an end fitting of the motion transmitting remote control assembly;

FIG. 3 is a partially broken away side view of the end fitting which has been molded about the conduit;

FIG. 4 is an end view taken substantially along lines 4—4 of FIG. 3;

DESCRIPTION OF PREFERRED EMBODIMENT

Figure 5:
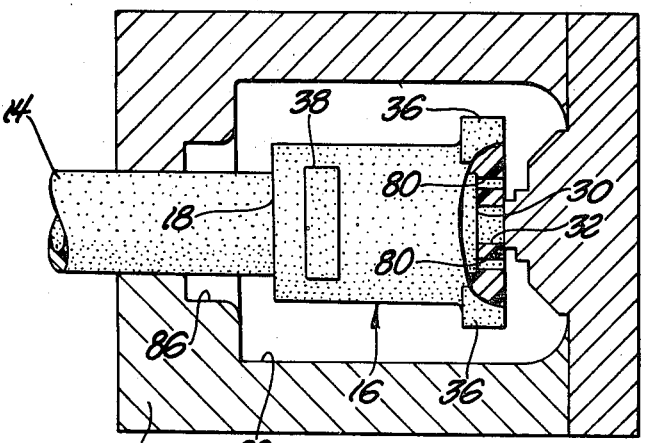
FIG. 5 is a partially broken away view of the end fitting and conduit disposed within a mold assembly for making the vibration dampener of the motion transmitting remote control assembly.

A motion transmitting remote control assembly of the type for transmitting motion in a curved path by a flexible motion transmitting core element is generally shown at 10 in FIG. 1. The assembly 10 includes a flexible motion transmitting core element 12 and guide means for movably supporting the core element 12. The guide means includes a flexible conduit 14 and an end fitting 16 disposed about an end portion of the conduit 14. The conduit 14 extends from a first end 18 of the end fitting 16. The core element 12 extends from the other end 20 of the end fitting.

The assembly further includes a support housing generally indicated at 22 for supporting the guide means on a support structure such as a bulkhead or other partition whereby the core element 12 passes through an aperture in the bulkhead. A resilient vibration dampener 24 by the mold of the invention is disposed between the support housing 22 and the guide means for providing noise and vibration isolation therebetween. In other words, vibrations originating in the support structure or bulkhead and passing through the support housing 22 are absorbed by the vibration dampener 24 such that the vibrations are not passed on to the core element 12. In a similar fashion, such vibrations are passed in the opposite direction from the core element or conduit to the bulkhead or other support structure.

The end fitting 16, the support means 22, and the vibration dampener 24 are made of organic polymeric material. The vibration dampener 24 is made of a softer material than the end fitting 16 and the support housing 22. Thusly, the vibration dampener 24 isolates the end fitting 18 and the portion of the conduit 14 disposed within the support housing 22 from the support housing 22 so as to effectively diminish the communication of vibrations therebetween while not affecting the movement of the core element 12 within the assembly 10.

The vibration dampener 24 includes a cylindrical section 26 surrounding the end portion of the conduit 14 immediately adjacent the end 18 of the end fitting 16. The support housing 22 has an annular end wall 28 surrounding the cylindrical section 26 whereby the support housing 22 is isolated from the conduit 26. In other words, that portion of the conduit 14 extending from the end fitting 16 which is disposed within the support housing 22 is isolated therefrom by the cylindrical portion 26 of the vibration dampener 24. Therefore, the end fitting 16 and the end portion of the conduit 14 adjacent the first end 18 of the end fitting 16 are encapsulated within the vibration dampener 24. The end walls 28 of the support housing 23 surround the vibration dampener 24 and provide a mechanical interlocking engagement therewith.

The second end 20 of the end fitting 16 extends over the end face 30 of the conduit 14 and has a hole 32 therethrough. The vibration dampener 24 extends over the second end 20 of the end fitting 16 and has a hole 34 therethrough which is adjacent and coaxial with the hole 32 of the end fitting 16 such that the core element 12 extends through the holes 32 and 34. Thusly, the end fitting 16 is completely isolated from the support housing 22 while the hole 34 of the vibration dampener 24 does not contact the core element 12 and thusly, does not affect its movement within the assembly 10.

The end fitting 16 includes retentive flange means for preventing axial and rotational movement of the end fitting 16 in relation to the vibration dampener 24. The flange means includes a first pair of flanges 36 extending radially in opposite directions from the second end portion 20 of the end fitting 16. As best shown in FIG. 4, the end fitting generally indicated at 16 includes a second pair of flanges 38 extending radially in opposite directions from the end fitting 16 and are axially spaced from the first pair of flanges 36. The first pair of flanges 36 extend perpendicularly to the second pair of flanges 38. From the mold of the instant invention there is provided a flange means for preventing axial and rotational movement of the end fitting 16 within the vibration dampener 24. The retentive flanges prevent axial and rotational movement of the end fitting 16 within the vibration dampener 24. The flanges may be located in alternative positions along the end fitting 16 and still provide efficient prevention of axial rotational movement.

As shown in FIG. 1, there is included a swivel means generally indicated at 40 for swivelling movement relative to the guide means and for movably supporting the core element 12. The swivel means 40 is attached to the support housing 22 at a swivel joint generally indicated at 42. The swivel means 40 includes a male swivel portion 44 having a convex spherical surface. The support housing 22 includes a female swivel portion 46 having a partially concave spherical surface for receiving and supporting the male swivel portion 44 of the swivel means 40. A cup spacer 47 further defines the female swivel portion 46.

A core element 12 includes a slider rod 48 slidably supported in and extending from the swivel means 40. The slider rod 48 includes an end portion 50 having an opening 52 therethrough adapted for being pivotally secured to an actuating lever member. Alternatively, the attached lever may be actuated by the core element 12.

The support housing 22 includes retaining means generally indicated at 54 for retaining the support housing 22 in an aperture of the support structure which surrounds the support housing 22. The support housing 22 includes a body portion 56. The retaining means 54 includes an abutment portion 58 for abutting the support structure at one extremity of the aperture therein to prevent the support housing 22 from moving through the aperture. The retaining means 54 also includes a pair of flexible legs 60 extending towards the abutment 58 in a cantilevered fashion from the body portion 56 and spaced from the abutment portion 58 for moving through the aperture as the support housing 22 is inserted therein and for engaging the support housing 22 at the other extremity of the aperture for retaining the support housing 22 therein.

As shown in FIG. 1, the swivel means 40 includes a wiper cap 62 attached to the distal end thereof. The wiper cap 62 is in sliding engagement with the slider rod 48. The wiper cap 62 has a lip 64 abutting the distal end of the swivel means 40 for preventing foreign substances from entering the end of the swivel means 40 which would inhibit the movement of the slider rod 48 within the swivel means 40. The rubber-like boot 66 is frictionally held in place about the swivel means 40 and abuts the end portion 68 of the support housing 22 for preventing foreign subtances from entering the swivel joint 42.

The core element 12 is a flexible wire-like element. The slider rod 48 is tacked to the core element 12 at 70.

Figure 7:
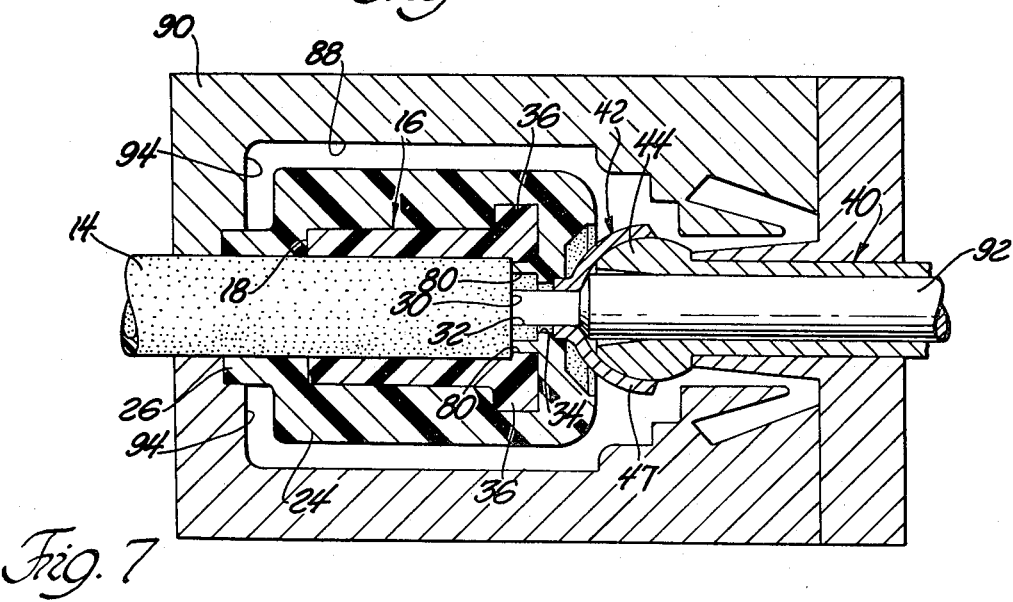
FIG. 7 is a cross-sectional view of the motion transmitting remote control assembly disposed within a mold assembly for making the support housing of the motion transmitting remote control assembly.

A method of making the present device is shown in FIGS. 2, 5 and 7.

As shown in FIG. 2, the end portion of the conduit 14 is inserted into the cavity 72 of a first mold 74. The first mold 74 has an integral mandrel 76. The mandrel 76 extends into the bore of the conduit 14 and defines the bore 32 of the end fitting 16. The mold 74 also includes insertion control means including at least one pin 78 radially spaced from the mandrel 76 for abutting against the end face 30 of the conduit 14 at a predetermined point within the cavity 72. An organic polymeric material is injected into the cavity 72 for molding the end fitting 16 about the conduit 14. As previously stated, the mandrel 76 forms the opening 32 in the end portion 20 of the end fitting 16. The pins 78 form corresponding openings 80 radially spaced from the opening 32. The mandrel 76 prevents molded material from entering the bore of the conduit and is, therefore, longer than the positioning pins 78.

Figure 6:
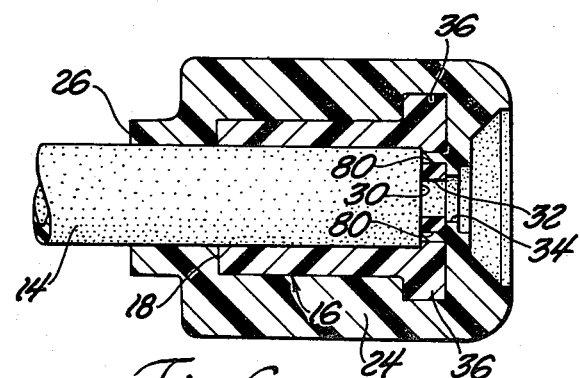
FIG. 6 is a cross-sectional view of the vibration dampener disposed about the end fitting and conduit.

As shown in FIG. 5, the end fitting 16 is inserted into a cavity 82 of a second mold 84. A vibration dampening material is injected into the mold for molding the vibration dampener 24 about the end fitting 16. The resulting product is shown in FIG. 6. The vibration dampener 24 is molded about the end fitting 16 and adjacent portion of the conduit 14 thereby encapsulating the end fitting 16 and the end portion of the conduit 14 adjacent the end fitting 16 within the vibration dampener 24. The cavity 82 of the mold 84 includes a portion 86 for molding the cylindrical section 26 of the vibration dampener 24 for surrounding the end portion of the conduit 14 immediately adjacent the end fitting 16. The mold 84 also includes a mandrel for insertion into the opening 32 of the end fitting 16 with annular steps, one of which abuts the end of the fitting 16 for positioning the fitting 16 axially within the cavity 82.

As shown in FIG. 7, the vibration dampener 24 is placed into a cavity 88 of a third mold 90. A mandrel 92 is used for plugging the holes 32 and 34 of the end fitting 16 and the vibration dampener 24 respectively and for positioning the cup spacer 47 and swivel means 40 in proper relation to the vibration dampener 24. An organic polymeric material is injected into the mold 90 for molding the supporting housing 22 about the vibration dampener 24. The cavity 88 of the mold 90 includes a portion 94 for molding the annular end wall 28 of the support housing 22 surrounding the cylindrical section 26 of the vibration dampener 24 whereby the support housing 22 is completely isolated from contact with the conduit 14 and the end fitting 16.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise as specifically described.

The embodiments of the invention in which an exclusive property or privilege is claimed are defined as follows:

1. A mold (74) for molding a motion transmitting remote control assembly (10) of the type including a flexible motion transmitting core element (12) supported by a conduit (14) having an end fitting (16) at the end thereof, said mold (74) comprising; a hollow mold body (74) defining a cavity (72) having an end wall therewithin including a mandrel (76) extending from said end wall and into said cavity for defining the bore (32) of the end fitting (16) and including at least one pin (78) radially spaced from said mandrel (76) and extending from said end wall for abutting the end of the conduit (14) as the conduit (14) is inserted into the cavity (72) for spacing the end of the conduit from said end wall and along the mandrel.

* * * * *